United States Patent
Skipper et al.

(10) Patent No.: US 9,863,484 B2
(45) Date of Patent: Jan. 9, 2018

(54) FRICTION RING, SYNCHRONIZER RING, SYNCHRONIZING UNIT AS WELL AS A VARIABLE GEAR TRANSMISSION FOR A VEHICLE

(71) Applicant: Oerlikon Friction Systems (Germany) GmbH, Bremen (DE)

(72) Inventors: Gary I. Skipper, Swansea (GB); Marcus Spreckels, Sagehorn (DE); Ulf Christoffer, Bremen (DE)

(73) Assignee: OERLIKON FRICTION SYSTEMS (GERMANY) GMBH, Bremen (DE)

( * ) Notice: Subject to any disclaimer, the term of this patent is extended or adjusted under 35 U.S.C. 154(b) by 91 days.

(21) Appl. No.: 14/568,389

(22) Filed: Dec. 12, 2014

(65) Prior Publication Data
US 2015/0167749 A1    Jun. 18, 2015

(30) Foreign Application Priority Data
Dec. 17, 2013   (EP) .................................... 13197885

(51) Int. Cl.
*F16D 23/06* (2006.01)
*F16D 23/02* (2006.01)

(52) U.S. Cl.
CPC .......... *F16D 23/025* (2013.01); *F16D 23/06* (2013.01); *F16D 2300/10* (2013.01)

(58) Field of Classification Search
CPC .................. F16D 23/025; F16D 23/06; F16D 2023/0625; F16D 2023/0681
See application file for complete search history.

(56) References Cited

U.S. PATENT DOCUMENTS

| | | |
|---|---|---|
| 3,414,098 A | 12/1968 | Kelbel |
| 4,698,889 A | 10/1987 | Patzer |
| 4,732,247 A | 3/1988 | Frost |
| 4,742,723 A | 5/1988 | Lanzerath |
| 5,560,461 A | 10/1996 | Loeffler |
| 6,065,579 A | 5/2000 | Nels |

(Continued)

FOREIGN PATENT DOCUMENTS

| | | |
|---|---|---|
| DE | 197 19 618 | 11/1998 |
| DE | 198 53 856 | 5/2000 |

(Continued)

OTHER PUBLICATIONS

Machine translation of EP 1199489 A1 downloaded from EPO.org on Aug. 10, 2016.*

(Continued)

*Primary Examiner* — Richard Lorence
(74) *Attorney, Agent, or Firm* — Greenblum & Bernstein, P.L.C.

(57) ABSTRACT

The invention relates to a friction ring (1) for a synchronizing unit (2) of a variable ratio gear transmission. The friction ring (1) comprises a conical friction body having an inner friction surface and an outer installation surface which each bound the friction ring body in a radial peripheral direction extending perpendicular to an axial friction ring axis (4). The friction ring body comprises a projection (9) for restraining a movement of the friction ring (1) relative to a synchronizer ring (7) substantially along the friction axis in operation in the synchronizing unit (2).

10 Claims, 6 Drawing Sheets

(56) References Cited

U.S. PATENT DOCUMENTS

Figure 1A:
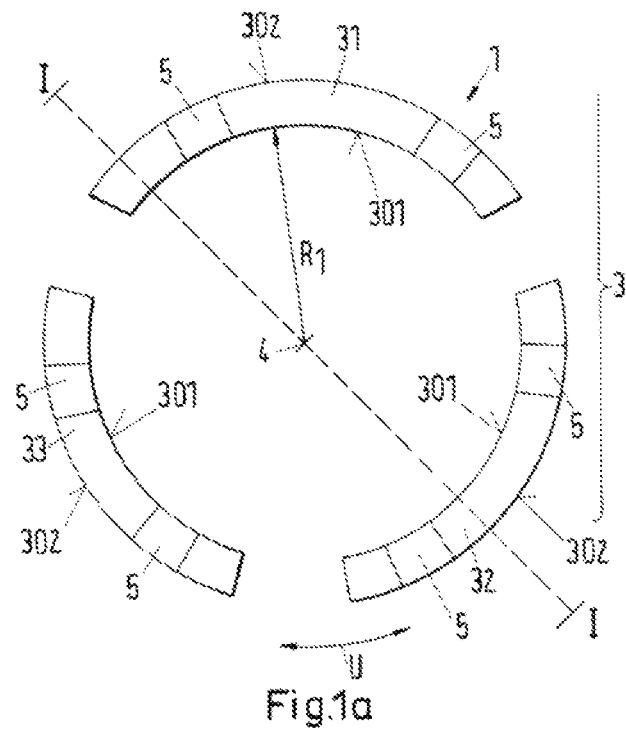

| | | | |
|---|---|---|---|
| 6,588,563 B1 * | 7/2003 | Sarrach | F16D 23/025 192/53.32 |
| 7,121,393 B1 * | 10/2006 | Skipper | F16D 23/025 192/48.91 |
| 7,717,247 B2 * | 5/2010 | Stockl | F16D 23/025 192/53.32 |
| 8,342,307 B2 | 1/2013 | Christoffer | |
| 9,400,019 B2 * | 7/2016 | Skipper | F16D 23/025 |
| 2008/0067026 A1 | 3/2008 | Spreckels | |
| 2008/0149450 A1 | 6/2008 | Christoffer | |
| 2009/0133982 A1 | 5/2009 | Christoffer | |
| 2012/0067691 A1 * | 3/2012 | Takata | F16D 23/025 192/107 M |

FOREIGN PATENT DOCUMENTS

| | | | |
|---|---|---|---|
| DE | 199 22 325 | 7/2000 | |
| DE | 102005054085 A1 * | 5/2007 | F16D 23/025 |
| DE | 102007058573 | 6/2009 | |
| DE | 102008061967 A1 * | 6/2010 | F16D 23/025 |
| EP | 0 280 136 | 8/1988 | |
| EP | 1199489 A1 * | 4/2002 | F16D 23/025 |
| EP | 1 312 823 | 5/2003 | |
| EP | 1 507 091 | 8/2006 | |
| EP | 2 677 187 | 5/2013 | |
| EP | 2 894 363 | 7/2015 | |
| JP | 62-46047 | 2/1987 | |
| JP | 62-46048 | 2/1987 | |
| JP | 8-219173 | 8/1996 | |
| JP | 8-219175 | 8/1996 | |
| JP | 10-78047 | 3/1998 | |
| JP | 2004-76764 | 3/2004 | |
| JP | 2005-344849 | 12/2005 | |

OTHER PUBLICATIONS

Machine translation of DE 102005054085 A1 downloaded from EPO.org on Aug. 10, 2016.*
Machine translation of DE 102008061967 A1 downloaded from EPO.org on Aug. 10, 2016.*

* cited by examiner

FRICTION RING, SYNCHRONIZER RING, SYNCHRONIZING UNIT AS WELL AS A VARIABLE GEAR TRANSMISSION FOR A VEHICLE

The present application claims priority under 35 U.S.C. §119 of European Patent Application No. 13197885.0 filed on Dec. 17, 2013, the disclosure of which is expressly incorporated by reference herein in its entirety.

CROSS-REFERENCE TO RELATED APPLICATIONS

Not applicable

STATEMENT REGARDING FEDERALLY SPONSORED RESEARCH OR DEVELOPMENT

Not applicable

STATEMENT REGARDING PRIOR DISCLOSURES BY THE INVENTOR OR A JOINT INVENTOR

Not applicable

BACKGROUND OF THE INVENTION

The invention relates to a friction ring for a synchronizing unit of a selectable variable ratio gear transmission, to a synchronizer ring, to a synchronizing unit as well as to a variable ratio gear transmission for a vehicle in accordance with the preamble of the independent claims.

In a mechanical, selectable variable ratio gear transmission, e.g. in vehicle transmissions, synchronizer rings serve to synchronize the relative speeds which occur between the gear wheel and the gear shaft on a gear change to one another. The synchronization is achieved in this respect by friction between the corresponding friction partners. The function of such transmissions and the process of the synchronization procedure are known per se and no longer have to be explained in more detail to the person skilled in the art here.

It is known for protection against premature wear and/or to improve the friction characteristic to provide the friction surfaces of synchronizing rings with a friction layer, said synchronizing rings being produced as a rule from a metal or a metal alloy such as from brass or steel. Very different types of friction layers are in use in this connection, e.g. thermal spray layers made of molybdenum, carbon friction layers or friction layers made from other materials.

Synchronizing units for variable ratio gear transmissions or individual components of synchronizing units are described in a versatile and detailed manner in the prior art.

For example, manual shift transmissions and dual-clutch transmissions are the dominating type of transmissions in the compact and medium-sized vehicle segment today in many applications, in particular with front cross-wheel drives. The shifting characteristic of these types of transmissions is substantially determined by the synchronizing whose principle today as then is based on the so-called Borg-Warner concept. A high efficiency for realizing shorter shifting times with small shifting forces and a high shifting comfort are demands on the system of synchronizing which are becoming more and more important.

The geometrical configuration of a classical Borg-Warner synchronizing is determined in this respect by a conflict of objective with respect to efficiency and shifting comfort. A high efficiency is achieved by small conical angles of the friction pairing; the reinforcement effect of the cone generates high synchronization torques despite lower actuation forces. In contrast, the self-locking effect, which prevents a release of the friction surfaces and substantially and noticeably impairs the shifting comfort for the driver, sets a natural limit to the minimization of the conical angle. The optimization of a synchronizing is therefore always a compromise between efficiency and shifting comfort.

The dominant type of synchronizing which is used within the MT transmissions, AMT transmissions and DCT transmissions well known to the person skilled in transmissions is configured in the conventional Borg-Warner design. Due to the constant demands for higher shifting performance and torques, demanding multiple conical synchronizing devices having two-fold, three-fold and, in specific niche applications, even four-fold friction surfaces have been developed on this basis. These highly developed synchronizing modules have increased performance and torque capacities due to the multiple friction surfaces. Nevertheless, they also increase the complexity, costs and not least, also the weight of the corresponding transmissions.

The EP 0 280 136 A1 discloses a synchronizer element for a stepped-ratio motor vehicle gearing with a base body and a friction body. The friction body is fixed in a positively locking manner to the base body in an axial direction and is supported in a floating manner on the base body in a circumferential direction.

In the non-prepublished EP 2 677 187 A1 a friction ring for a synchronizing unit of a variable ratio gear transmission is disclosed, wherein an inner friction surface extends at a predefinable friction angle and an outer installation surface extends at a predefinable installation angle, each extending conically along the friction ring axis, with the friction angle differing from the installation angle. This friction ring can, for example, be made up of a plurality of friction ring segments.

These already known friction rings can, however, be complex and/or expensive in handling under certain circumstances due to the segmentation if they are mounted at and/or in a synchronizing unit. It can moreover occur that the friction ring and the synchronizer ring cannot be positioned sufficiently exactly with respect to one another in the axial direction or that a displacement in the axial direction takes place in operation.

BRIEF SUMMARY OF THE INVENTION

The present invention aims to avoid the disadvantages of what is known, in particular that is to provide a friction ring for a synchronization unit and a synchronizer ring such that an installation of the friction ring is simplified and such that an axial position of the friction ring and the synchronizer ring relative to one another can be set more reliably on installation and in operation and furthermore a high shifting comfort is enabled.

The invention also provides for a synchronizer unit of a variable ratio gear transmission, said synchronizer unit comprising a friction ring comprising a first annular end arranged on a smaller diameter side, a second annular end arranged on a larger diameter side, a conical inner surface arranged between the first and second annular ends and extending at a first conical angle, a conical outer installation surface arranged between the first and second annular ends, being coaxial with the conical inner surface, and extending at a second conical angle that is different from the first conical angle, and a tab arranged on the first annular end and oriented perpendicular to an axis of the conical inner surface, and, when installed, being configured to limit axial movement of the friction ring relative to the synchronizer ring. A synchronizer ring comprises a first annular end arranged on a smaller diameter side, a second annular end arranged on larger diameter side, teeth arranged on a radially projecting flange located at the larger diameter side, a conical outer surface arranged between the first and second annular ends and extending at a first conical angle, a conical inner installation surface structured and arranged to, when installed, directly engage with the conical outer installation surface of the friction ring, said conical inner installation surface being arranged between the first and second annular ends, being coaxial with the conical outer surface, and extending at a second conical angle, and a cut-out arranged on the first end and being oriented perpendicular to an axis of the conical inner installation surface and being structured and arranged to, when installed, engage with the tab of the friction ring so as to limit axial movement of the friction ring relative to the synchronizer ring.

In embodiments, the friction ring further comprises a security against rotation arranged on the first annular end being oriented parallel to said axis and being structured and arranged to, when installed, engage with a first end of the synchronizer ring so as to prevent relative rotation between the friction ring and the synchronizer ring.

In embodiments, the friction ring further comprises a security against rotation arranged on the conical outer installation surface being oriented perpendicular to said axis and being structured and arranged to, when installed, engage with a further cut out of the synchronizer ring so as to prevent relative rotation between the friction ring and the synchronizer ring.

In embodiments, the friction ring comprises a slit that allows the friction ring to expand radially.

In embodiments, the synchronizer unit further comprises a friction coating arranged on the conical inner surface of the friction ring.

The invention also provides for a synchronizer unit for a variable ratio gear transmission, said synchronizer unit comprising a friction ring comprising a first annular end arranged on a smaller diameter side, a second annular end arranged on a larger diameter side, a conical inner surface arranged between the first and second annular ends and extending at a first conical angle, a conical outer installation surface arranged between the first and second annular ends, being coaxial with the conical inner surface, and extending at a second conical angle that is different from the first conical angle. A synchronizer ring comprises a first annular end arranged on a smaller diameter side, a second annular end arranged on larger diameter side, teeth arranged on a radially projecting flange located at the larger diameter side, a conical outer surface arranged between the first and second annular ends and extending at a first conical angle, a conical inner installation surface structured and arranged to, when installed, directly engage with the conical outer installation surface of the friction ring, said conical inner installation surface being arranged between the first and second annular ends, being coaxial with the conical outer surface, and extending at a second conical angle, and a tab arranged on the second side and oriented perpendicular to an axis of the conical inner installation surface, and, when installed, being configured to limit axial movement of the friction ring relative to the synchronizer ring.

In embodiments, the friction ring further comprises a security against rotation arranged on the first annular end being oriented parallel to said axis and being structured and arranged to, when installed, engage with a first end of the synchronizer ring so as to prevent relative rotation between the friction ring and the synchronizer ring.

In embodiments, the friction ring further comprises a security against rotation arranged on the conical outer installation surface being oriented perpendicular to said axis and being structured and arranged to, when installed, engage with a cut out of the synchronizer ring arranged on the conical inner installation surface so as to prevent relative rotation between the friction ring and the synchronizer ring.

In embodiments, the friction ring comprises a slit that allows the friction ring to expand radially.

In embodiments, the synchronizer unit further comprises a friction coating arranged on the conical inner surface of the friction ring.

The invention relates to a friction ring for a synchronizing unit of a variable ratio gear transmission. The friction ring comprises a conical friction ring body having an inner friction surface and an outer installation surface which each bound the friction ring body in a radial peripheral direction extending perpendicular to an axial friction ring axis. The friction ring body comprises a restraining device for restraining a movement of the friction ring relative to another component of the synchronizing unit substantially along the friction ring axis in operation in the synchronizing unit. The component is in particular a synchronizer ring.

This has the advantage that the friction ring can be installed by means of the restraining device with respect to the friction ring axis such that a movement can be substantially limited parallel to the friction ring axis. A simplified installation of the friction ring can hereby be achieved and/or a more reliable positioning in operation, which makes the operation more reliable.

The restraining device is preferably configured such that the friction ring can be displaced relative to the synchronizer ring parallel to the friction ring axis by at most 25% and preferably at most 15% of the maximum height H of the friction ring parallel to the friction ring axis.

The synchronizing unit usually comprises as components a sliding coupling, a synchronizer hub, a synchronizer ring as well as a gear wheel which are arranged coaxially to the friction ring axis.

The restraning device can in particular be fixed at the friction ring, for example by an adhesive bonding and/or by welding. The restraining device is preferably configured as an integral part of the friction ring which is formed, for example, integrally with the friction ring in a shaping process or in a stamping process.

According to the invention the inner friction surface extends at a predefinable friction angle $\alpha_1$ and the outer installation extends at a predefinable installation angle $\alpha_2$, in each case conically along the friction ring axis, with the friction angle $\alpha_1$ differing from the installation angle $\alpha_2$. The installation angle $\alpha_2$ is preferably larger than the friction angle $\alpha_1$.

A conflict of objective is thereby reliably resolved with respect to efficiency and shifting comfort such has long been known in the prior art. On the one hand, a high efficiency of the friction pairing is achieved, that is a reinforcement effect is achieved, by this arrangement of the inner friction surface and of the outer installation surface so that the cone can generate high synchronizing torques despite low actuation forces. On the other hand, the known harmful self-locking effect, which prevents, or at least makes more difficult, a release of the friction surfaces and which substantially and noticeably impairs the shifting comfort for the driver is simultaneously practically completely avoided.

The friction ring can preferably be inserted into a synchronizer ring having a toothed wheel side, with the restraining device being arranged at an end remote from the toothed wheel side in a use in accordance to its intended purpose. In other words the friction ring has the restraining device at the end remote from the toothed wheel side in the installed state.

The friction ring and the synchronizer ring are in particular configured such that a movement of the friction ring relative to another component of the synchronizing unit can be bounded substantially along the friction ring axis in operation in the synchronizing unit by means of a shape matching between the restraining device of the friction ring and the synchronizer ring. Such a shape matching can take place by an engagement of an element of the friction ring, for example, into a cut-out in the synchronizer ring; a movement of the friction ring relative to the synchronizer ring can hereby be substantially bounded along the friction ring axis in operation in the synchronizing unit, with in particular a relative rotational movement of the friction ring and of the synchronizer ring about the friction ring axis being made possible in at least one angular section.

A synchronizer ring typically has an end having a toothed wheel in the axial direction of the synchronizer ring substantially parallel to friction ring axis for interaction with a sliding coupling of the synchronizing unit. The friction ring is usually introduced into the synchronizer ring and fastened from the toothed wheel side. The arrangement of the restraining device on the end remote from the toothed wheel side has the advantage that the friction ring can be fastened and simply installed securely against a displacement from the toothed wheel side.

The restraining device is preferably configured as at least one projection. The at least one projection in particular extends substantially perpendicular to the friction ring axis. The at least one projection in particular extends in at least one section substantially parallel to the peripheral direction.

This has the advantage that the friction ring can be hooked to the synchronizer ring by means of the projection so that a displacement of the friction ring out of the toothed wheel side of the synchronizer ring can be bounded by the shape matching. A good fastening of the friction ring in the synchronizer ring can thus be achieved with a simultaneous ensuring of a reliable operation.

A further aspect of the present invention relates to a friction ring for a synchronizing unit of a variable ratio gear transmission. The friction ring is in particular configured as described above. The friction ring comprises a conical friction ring body having an inner friction surface and an outer installation surface which each bound the friction ring body in a radial peripheral direction extending perpendicular to an axial friction ring axis. The friction ring body is formed as a slit friction ring body having at least one slit. The friction ring body has, in a first expanded configuration, a first radius $R_1$ and, in a second compressed configuration, a second radius $R_2$. The friction ring body in particular has exactly one slit.

This has the advantage that the friction ring can be configured in one part and in addition the radius is variable so that an installation of the friction ring can be simplified. In addition, a reliable fastening of the friction ring is possible due to the single part design of the friction ring in the synchronizer ring; the reliability is hereby increased in operation.

With a small angle of the friction surface, it is possible in dependence on the application and on the embodiment that a self-locking can occur on the toothed wheel cone. The slitting of the friction ring has the further advantage that this can be avoided.

A "slit friction ring" can in particular have a throughgoing slit through the friction ring, with the slit being arranged at an angle not equal to 0° or 180° with respect to the peripheral direction.

The slit in the friction ring body preferably has a mean width B parallel to the peripheral direction which sweeps over a maximum of 5 mm, and preferably over a maximum of 2 mm, of the periphery of the friction ring body. This has the advantage that a simple installation can be ensured with a simultaneously good friction effect in operation by the friction ring.

The slit is arranged substantially parallel to the friction ring axis.

The mentioned friction ring with a friction ring body with at least one slit is also advantageously realizable, if the named friction angle $\alpha_1$ is equal to the installation angle $\alpha_2$.

The friction ring body is preferably a segmented friction ring body which comprises a plurality of separate friction ring segments which form the friction ring body in a ring-shaped arrangement such that the friction ring body has a first radius $R_1$ in a first expanded configuration and a second radius $R_2$ in a second compressed configuration.

With a smaller angle of the friction surface, it is possible in dependence on the application and on the embodiment that a self-locking can occur on the toothed wheel cone. The segmentation now has the advantage that this is avoidable.

A security against rotation is preferably provided at the friction ring body which preferably extends along the friction ring axis and/or perpendicular to the friction ring axis. The security against rotation can in particular be configured such that a rotation relative to the synchronizer ring or relative to the gear wheel can substantially be prevented.

The mentioned friction ring with a friction ring body with a security against rotation is also advantageously realizable, if the named friction angle $\alpha_1$ is equal to the installation angle $\alpha_2$.

A friction coating, in particular a friction coating in the form of a carbon friction liner, is preferably provided at the friction surface and/or at the installation surface. This has the advantage that a high mechanical and/or thermal load of the friction pairing can be compensated at least in part. It's also possible that the friction coating is located at a friction partner of the friction ring, for example at a synchronizer ring or a gear wheel.

The friction ring preferably has a steel stamped part or a shaped sheet metal part. This has the invention that an industrial mass production is particularly simple or inexpensive.

A further aspect of the present invention relates to a synchronizer ring having a friction ring with a friction angle $\alpha_1$ differing from an installation angle $\alpha_2$. The synchronizer ring comprises at least one security against displacement for restraining a displacement of the friction ring substantially along a friction ring axis in operation in the synchronizing unit.

This has the same advantage as described above with respect to the restraining device.

The friction ring and the synchronizer ring are in particular configured such that a movement of the friction ring relative to another component of the synchronizing unit can be bounded substantially along the friction ring axis in operation in the synchronizing unit by means of a shape matching between the friction ring and the security against displacement of the synchronizer ring.

The security against displacement is preferably arranged at a toothed wheel side of the synchronizer ring. The security against displacement can in particular be fixed at the synchronizer ring, for example by an adhesive bonding and/or welding. The security against displacement can in particular be configured as an integral part of the friction ring, which is in particular formed integrally with the synchronizer ring in a shaping process or stamping process, for example.

The security against displacement is preferably configured as at least one tab, with the at least one tab extending substantially perpendicular to the friction ring axis. The at least one tab in particular extends substantially parallel to the peripheral direction U in at least one section.

A further aspect of the present invention relates to a synchronizing unit having a friction ring as described above or a synchronizer ring as described above.

The synchronizing unit preferably comprises a sliding coupling, a synchronizer hub, a synchronizer ring as well as a gear wheel which are arranged coaxially to the friction ring axis such that the synchronizer ring can be displaced in the operating state by the sliding coupling together with the friction ring along the friction ring axis in the direction to the gear wheel so that the inner friction surface of the friction ring body can be brought into engagement with the gear wheel.

A further aspect of the present invention relates to a variable ratio gear transmission for a vehicle, in particular for a passenger car, a transporter or a truck, having a friction ring or a synchronizing unit as described above.

BRIEF DESCRIPTION OF THE SEVERAL VIEWS OF THE DRAWING(S)

Figure 1B:
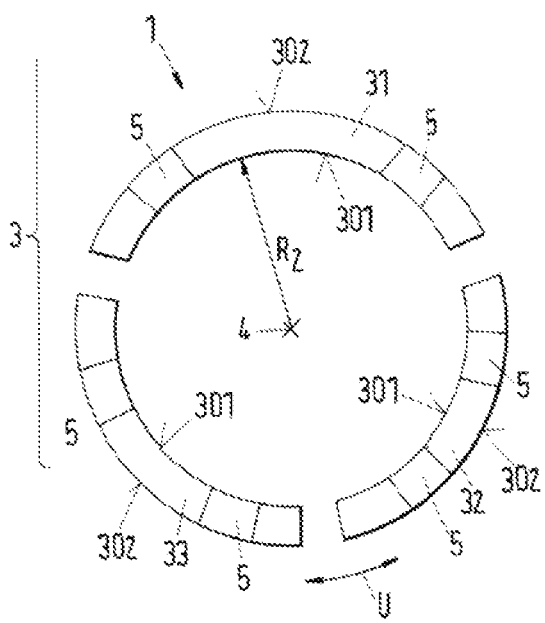
Figure 1C:
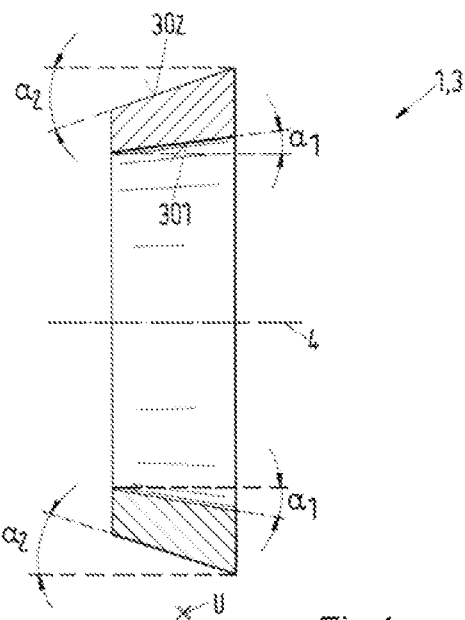
Figure 1D:
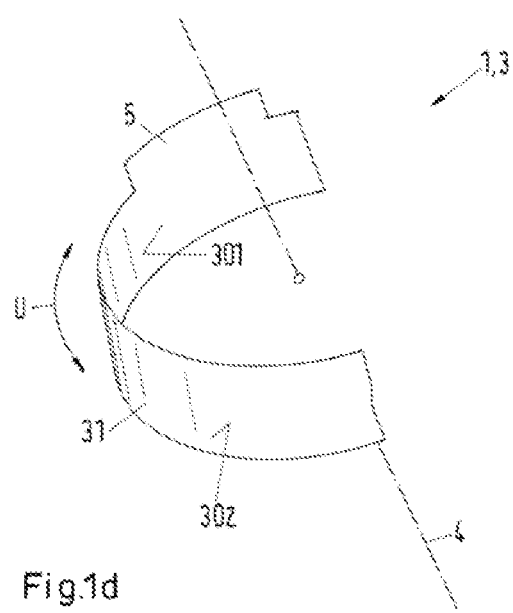
Figure 2A:
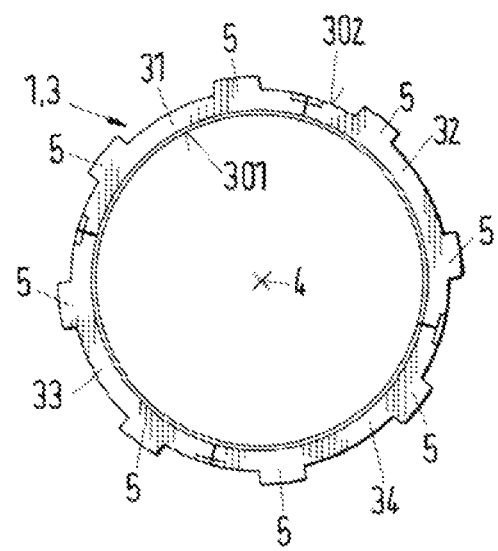
Figure 2B:
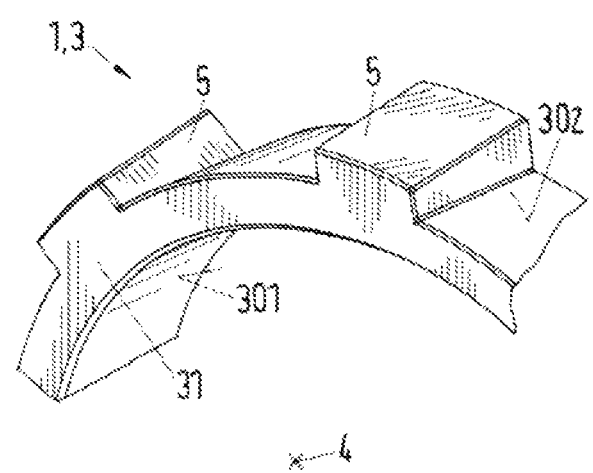
Figure 3:
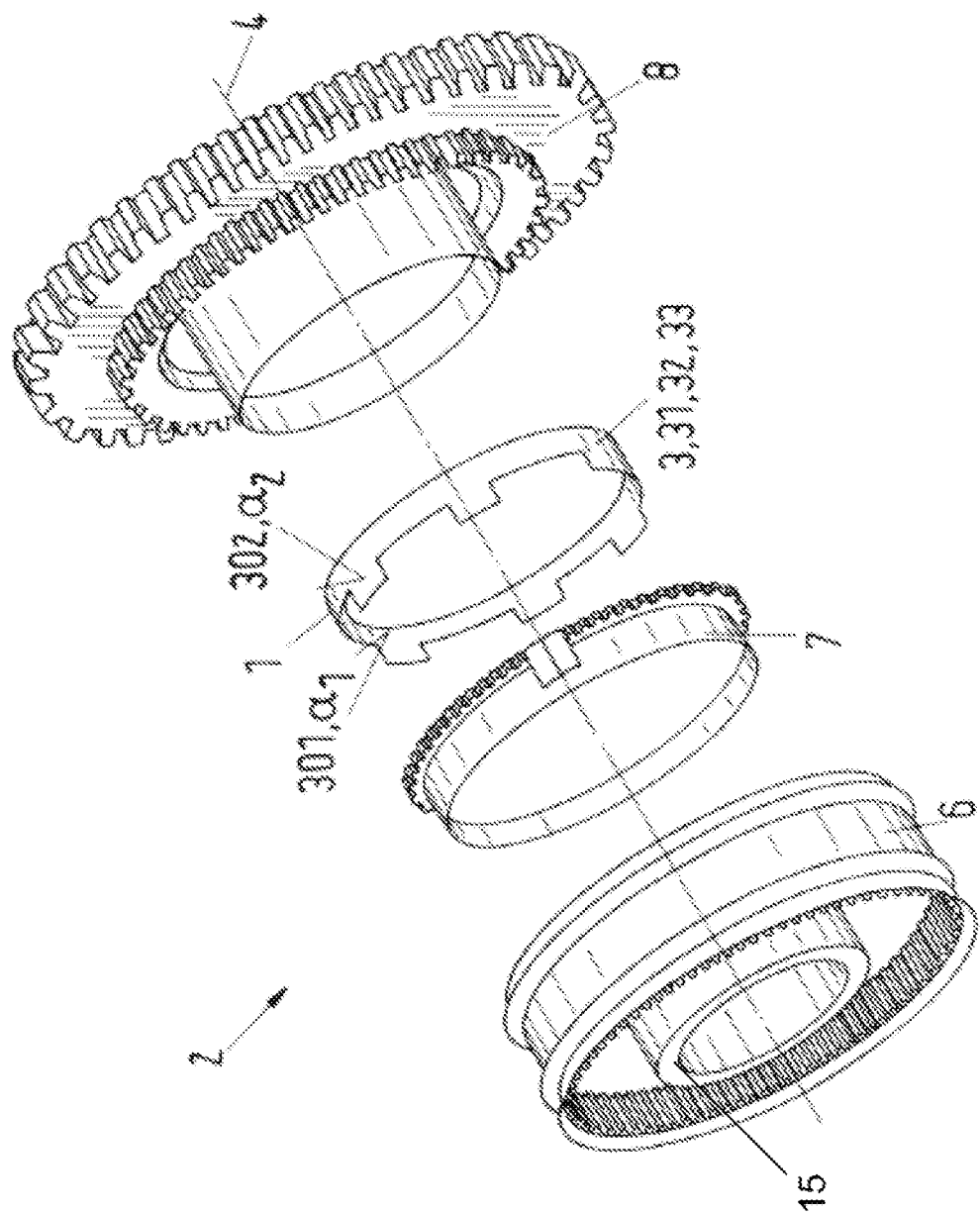
Figure 4:
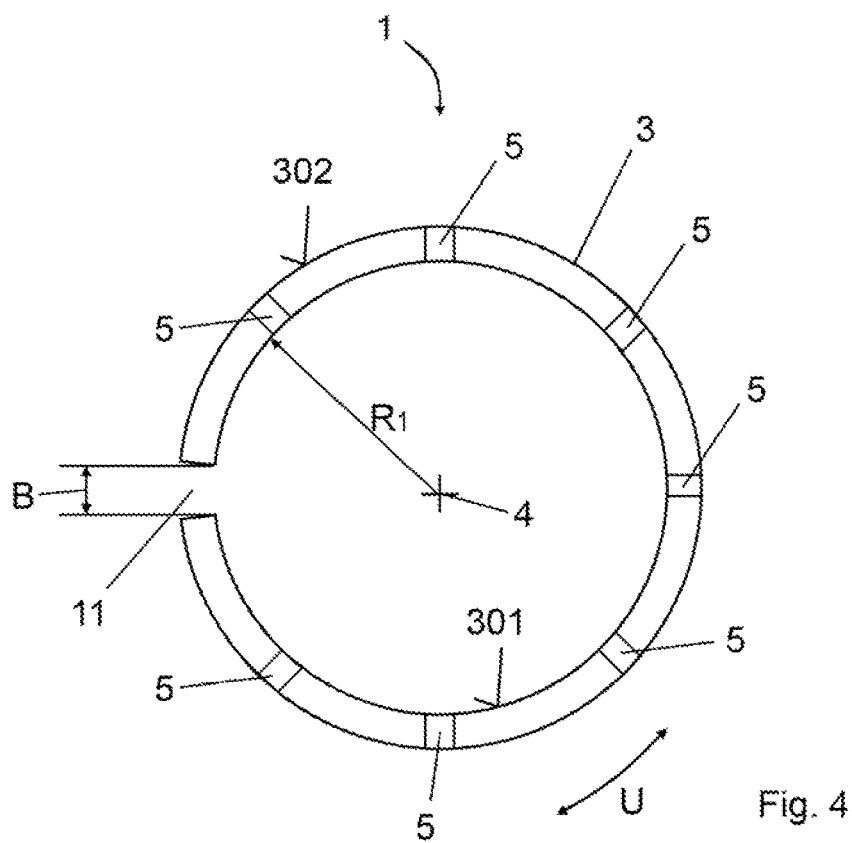
Figure 5:
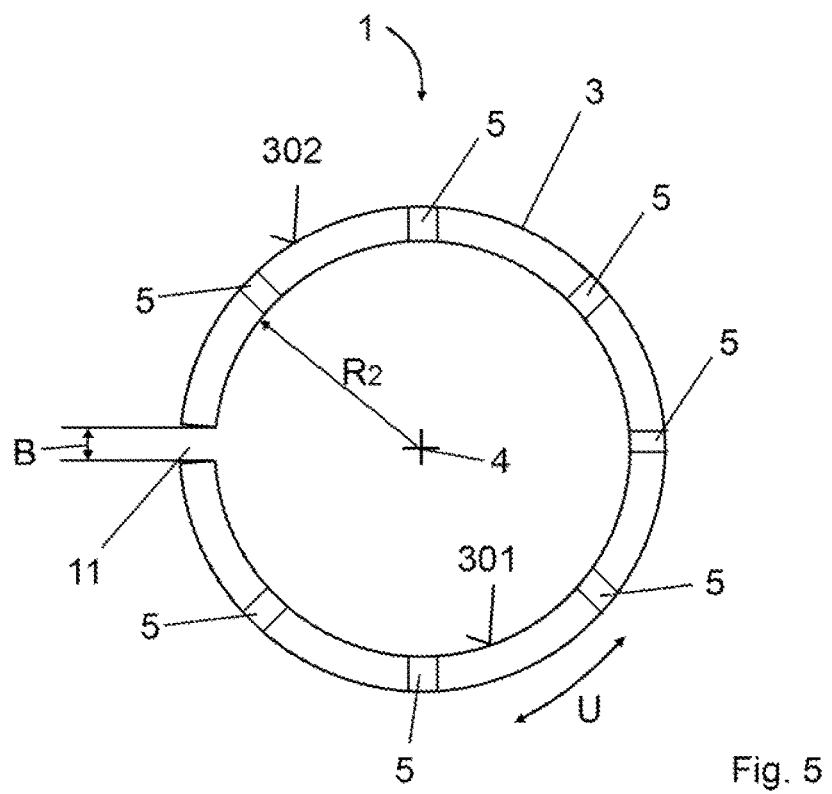
Figure 6:
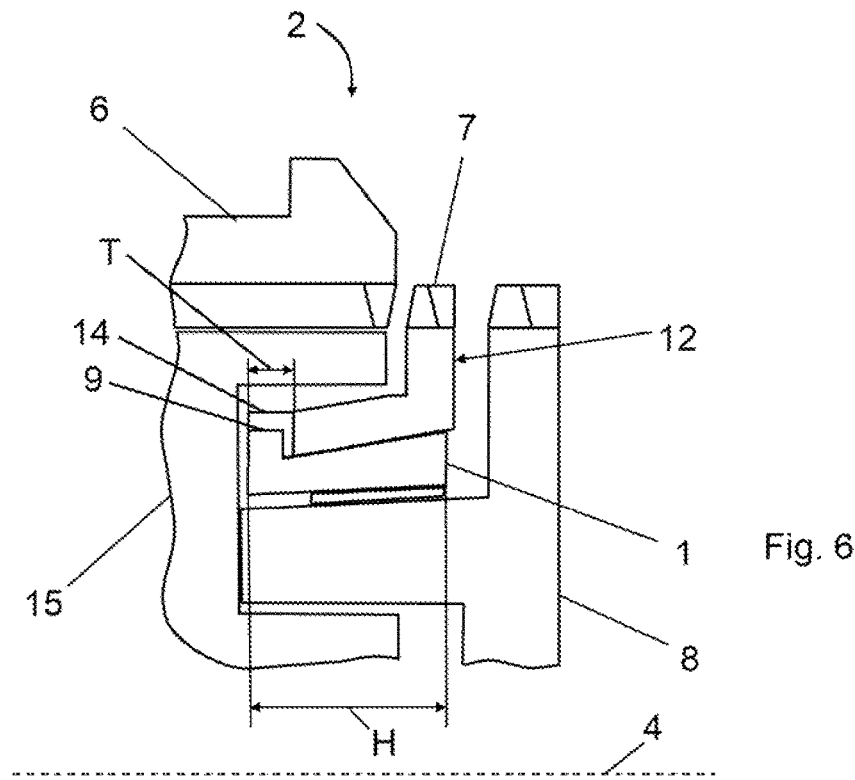
Figure 7:
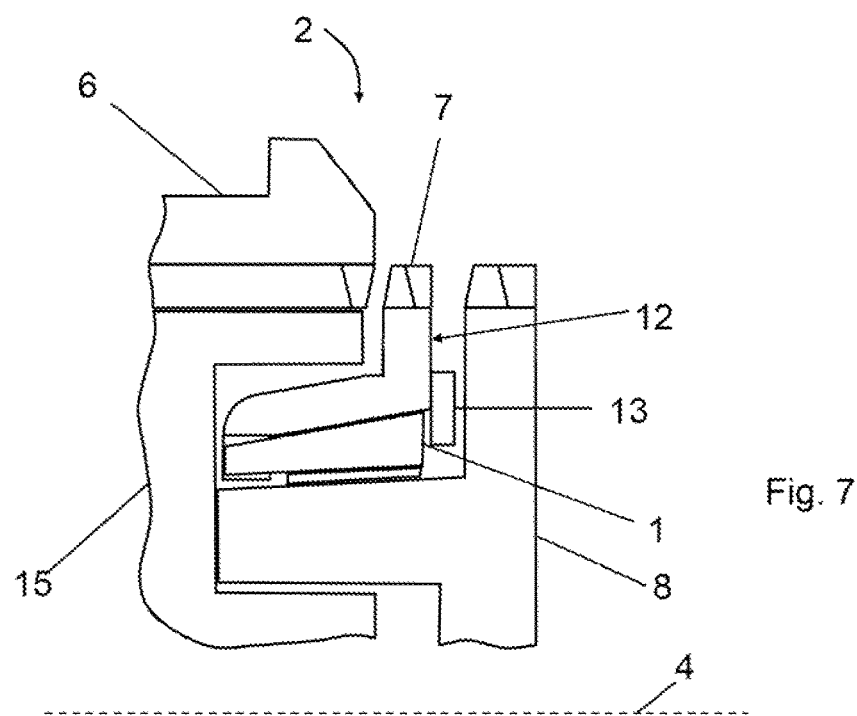

Further features and advantages of the invention will be explained in more detail in the following with reference to embodiments for a better understanding without the invention being restricted to the embodiments. There are shown FIG. 1a a friction ring having a segmented friction ring body in an expanded configuration;

FIG. 1b the friction ring in accordance with FIG. 1a in a compressed configuration;

FIG. 1c a section along the line I-I in accordance with FIG. 1a;

FIG. 1d a section of the friction ring in accordance with FIG. 1a or FIG. 1b in a perspective view;

FIG. 2a a second embodiment of a segmented friction ring having radial securities against rotation;

FIG. 2b a section of the friction ring in accordance with FIG. 2a in a perspective view;

FIG. 3 a simple embodiment of a synchronizing unit;

FIG. 4 a slit friction ring in accordance with the invention in an expanded configuration;

FIG. 5 the slit friction ring in accordance with the invention in accordance with FIG. 4 in a compressed configuration;

FIG. 6 a slit friction ring in accordance with the invention having a restraining device in a synchronizing unit; and FIG. 7 a synchronizer ring in accordance with the invention having a security against displacement in a synchronizing unit.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

FIG. 1a and FIG. 1b or FIG. 1c and FIG. 1d show one and the same very simple embodiment of a friction ring having a segmented friction body in a schematic representation, wherein the friction ring is designated as a whole in the following by the reference numeral 1.

The same reference numerals designate the same features in all Figures.

FIG. 1a shows the friction ring 1 in this respect in an expanded configuration, whereas FIG. 1b shows the same friction ring in a compressed configuration. FIG. 1c shows for better understanding a section along the line I-I in accordance with FIG. 1a, whereas a section of the friction ring 1 in accordance with FIG. 1a and FIG. 1b is shown in a perspective view with reference to FIG. 1d to be able to better see the securities against rotation 5 extending along the friction ring axis 4 of the friction ring 1.

The friction ring 1 in accordance with FIG. 1a to FIG. 1d serves for the use in a synchronizing unit 2 of a variable ratio gear transmission, in particular for a vehicle, specifically for a passenger car, for a transporter or for a truck. The friction ring 1 comprises a conical friction ring body 3 having an inner friction surface 301 and an outer installation surface 302, which is preferably configured as a further friction surface, which each bound the friction ring body 3 in a radial peripheral direction U extending perpendicular to an axial friction ring axis 4. In this respect, the inner friction surface 301 extends at a predefinable friction angle $\alpha_1$ and the outer installation surface 302 extends at a predefinable installation angle $\alpha_2$, in each case conically along the friction ring axis 4, wherein the friction angle $\alpha_1$ differs from the installation angle $\alpha_2$ in accordance with the present invention.

As can in particular be seen from FIG. 1c, the installation angle $\alpha_2$ is particularly preferably larger than the friction angle $\alpha_1$. In this respect, it is also possible in principle that the friction angle $\alpha_1$ is larger than the installation angle $\alpha_2$.

As can clearly be recognized with reference to FIG. 1a and FIG. 1, the friction ring body 3 in this specific embodiment is a segmented friction ring body 3 which comprises a plurality of separate friction ring segments 31, 32, 33, in the present specific embodiment, that is, three friction ring segments 31, 32, 33 which form the friction ring body 3 in a ring-shaped arrangement such that the friction ring body 3 in a first expanded configuration in accordance with FIG. 1a has a first radius $R_1$ and in a second compressed configuration in accordance with FIG. 1b a second radius $R_2$.

It is understood in this respect that the friction ring 1 can also be built up from a different number of friction ring segments 31, 32, 33, 34, e.g. as shown by way of example with reference to FIG. 2a and FIG. 2b, also of four friction ring segments 31, 32, 33, 34 or also, for example, only of two or more than four friction ring segments 31, 32, 33, 34.

In this respect at least one security against rotation 5 is particularly preferably provided at the friction ring body 3 and preferably extends along the friction ring axis 4, which can be seen particularly clearly from FIG. 1d.

FIG. 2a and FIG. 2b in this respect show the already mentioned other embodiment of a friction ring 1 in accordance with the invention in which the security against rotation 5 extends substantially perpendicular to the friction ring axis 4.

It is self-explanatory in this respect that independently of the shown specific embodiments the number of securities against rotation 5 can differ in dependence on the embodiment and any desired number of securities against rotation 5 can be provided. In very specific cases, it is even possible that the securities against rotation 5 are missing at the friction ring 1; and/or that, for example, other measures can be provided which prevent a rotation of the friction ring 1 in the operating state.

A friction coating, in particular a friction coating in the form of a carbon friction liner, which is not shown explicitly in the Figures for reasons of clarity and which can inter alia serve to at least partly compensate a resulting high mechanical and/or thermal load on the friction pairing can particularly advantageously be provided at the friction surface 301 and/or at the installation surface 302.

The friction ring 1 is in this respect particularly advantageously a stamped steel part or a shaped sheet metal part, which in particular makes industrial mass production particularly simple or inexpensive.

FIG. 3 shows in a schematic representation a synchronizing unit 2 having a friction ring 1.

The synchronizing unit 2 in accordance with FIG. 3 further comprises, in addition to the friction ring 1, in a manner known per se a sliding coupling 6 having a synchronizer body 15, a synchronizer ring 7 and a gear wheel 8, wherein the aforesaid components are arranged coaxially to the friction ring axis 4 such that the synchronizer ring 7 can be displaced in the operating state by the sliding coupling 6 together with the friction ring 1 along the friction ring axis 4 in the direction toward the gear wheel 8 so that the inner friction surface 301 of the friction ring body 3 can be brought into engagement with the gear wheel 8.

The synchronizer ring 2 is in this respect produced from stamped steel of conventional construction in FIG. 3. The cone of the synchronizer ring 7 in this respect has the same large inner angle $\alpha_2$, that is identical to the installation angle $\alpha_2$ of the friction ring 1, with the synchronizer ring 7 having coupling pockets known per se and not shown in any more detail for the segmented friction ring 1. The segmented friction ring 1 in accordance with FIG. 3 is segmented into three equally large friction ring segments 31, 32, 33, which is not shown in detail for reasons of clarity in FIG. 3. The friction ring 1 in accordance with the invention in this respect has the installation surface 302 having the installation angle $\alpha_2$, with the installation surface 302 being used as a separation surface. The inner cone of the friction ring 1 is formed by the friction surface 301 having a friction angle $\alpha_1$, where $\alpha_1 < \alpha_2$. This inner cone surface, that is the friction surface 301, is used for synchronizing.

In the operating state, the synchronizer ring 7 is displaced axially in the direction toward the gear wheel 8 which is configured as a toothed wheel and thus the three friction ring segments 31, 32, 33 of the friction ring 1 are also covered by the angle $\alpha_2$. The synchronizer ring 7 and the segmented friction ring 1 are then moved simultaneously together and engage with the inner cone, that is with the friction surface 301 with the friction angle $\alpha_1$, onto the gear wheel 8 which likewise has a corresponding counter-cone having a cone angle $\alpha_1$. The synchronizer ring 7 can then control and index as a conventional synchronizer ring 7. The teeth of the sliding coupling 6 are in contact with the teeth of the synchronizer ring 7 and so generate a torque between the segmented friction ring 1 and the gear wheel 8 by the different speed.

After the synchronization, when the difference speed is zero, the sliding coupling 6 is moved axially, with it passing the synchronizer ring teeth and then being in contact with the teeth of the flanks of the gear wheel 8. As a result of this, there is no longer any axial force on the synchronizer ring 7. The large angle $\alpha_2$ will separate the system (angle>$\tan^{-1}\mu$). This results due to the elimination of the forces in the peripheral direction of the segmented friction ring 1. At this point, the synchronizer ring 7 and the segmented friction ring 1 break free of the gear wheel 8. The sliding coupling 6 can subsequently pass the gear wheel 8. The gearshift is then completely in engagement.

In this respect, at least two different options 1 and 2 are specifically possible. With option 1, the friction surface faces the inner cone of the segments having the small angle $\alpha_1$. The large release angle $\alpha_2$ is on the outer conical surface of the segments.

With option 2, the friction surface has the small angle $\alpha_1$ on the outer cone of the segments. The large release angle $\alpha_2$ is on the inner conical surface of the segments, with option 1 being the preferred concept in practice.

In FIG. 4, an alternative embodiment of a friction ring 1 in accordance with the invention is shown schematically in an expanded configuration with a radius $R_1$ which can be used, for example, in the synchronizing unit in accordance with FIG. 3.

The friction ring 1 comprises a slit friction ring body 3. Precisely one slit 11 is arranged in the friction ring body 3 and has a width B which sweeps over approximately 3 mm of the periphery of the friction ring body in the peripheral direction U.

In FIG. 5, the friction ring 1 in accordance with FIG. 4 is shown in a compressed configuration having the radius $R_2$. The slit 11 in accordance with FIG. 5 has a smaller width B than the slit in accordance with FIG. 4.

In FIG. 6, a section of a synchronizing unit 2 is shown schematically in an operating state. The synchronizing unit 2 comprises a gear wheel 8, a synchronizer ring 7, a friction ring 1, a synchronizer hub 15 and a sliding coupling 6.

The synchronizer ring 7 has a toothed wheel side 12 and a cut-out 14 having a width T into which a projection 9 of the friction ring projects. The projection 9 is arranged at an end remote from the toothed wheel side 12. The projection 9 extends substantially perpendicular to the friction ring axis 4. In addition, the projection 9 extends in a section substantially parallel to the peripheral direction, which is, however, not shown here.

The width T is larger than the width of the projection 9 parallel to the friction ring axis 4 so that the friction ring 1 has a specific clearance for movement parallel to the friction ring axis 4. The friction ring 1 is displaceable relative to the synchronizer ring 7 parallel to the friction ring axis by at most 15% of a maximum height H of the friction ring parallel to the friction ring axis 4.

In FIG. 7, a section of an alternative synchronizing unit 2 is shown schematically in an operating state. The gear wheel 8 and the sliding coupling 6 with the synchronizer hub 15 are of identical design as in FIG. 6.

Unlike FIG. 6, a tab 13 is arranged on the toothed wheel side 12 of the synchronizer ring 7. The friction ring 1 is configured as described.

It is achieved by the arrangement of the tab 13 that the friction ring 1 has a specific clearance in operation for moving parallel to the friction ring axis 4.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A synchronizer unit of a variable ratio gear transmission, said synchronizer unit comprising:
a friction ring comprising:
a first annular end arranged on a smaller diameter side;
a second annular end arranged on a larger diameter side;
a conical inner surface arranged between the first and second annular ends and extending at a first conical angle;
a conical outer installation surface arranged between the first and second annular ends, being coaxial with the conical inner surface, and extending at a second conical angle that is different from the first conical angle;
a projection arranged on the first annular end and oriented perpendicular to an axis of the conical inner surface, and, when installed, being configured to limit axial movement of the friction ring relative to a synchronizer ring;
the synchronizer ring comprising:
a first annular end arranged on a smaller diameter side;
a second annular end arranged on a larger diameter side;
teeth arranged on a radially projecting flange located at the larger diameter side;
a conical outer surface arranged between the first and second annular ends and extending at a first conical angle;
a conical inner installation surface structured and arranged to, when installed, directly engage with the conical outer installation surface of the friction ring;
said conical inner installation surface being arranged between the first and second annular ends, being coaxial with the conical outer surface, and extending at a second conical angle; and
a cut-out arranged on the first end and being oriented perpendicular to an axis of the conical inner installation surface and being structured and arranged to, when installed, engage with the projection of the friction ring so as to limit axial movement of the friction ring relative to the synchronizer ring.

2. The synchronizer unit of claim 1, wherein the friction ring further comprises a security against rotation arranged on the first annular end being oriented parallel to said axis and being structured and arranged to, when installed, engage with a first end of the synchronizer ring so as to prevent relative rotation between the friction ring and the synchronizer ring.

3. The synchronizer unit of claim 1, wherein the friction ring further comprises a security against rotation arranged on the conical outer installation surface being oriented perpendicular to said axis and being structured and arranged to, when installed, engage with a further cut out of the synchronizer ring so as to prevent relative rotation between the friction ring and the synchronizer ring.

4. The synchronizer unit of claim 1, wherein the friction ring comprises a slit that allows the friction ring to expand radially.

5. The synchronizer unit of claim 1, further comprising a friction coating arranged on the conical inner surface of the friction ring.

6. A synchronizer unit for a variable ratio gear transmission, said synchronizer unit comprising:
a friction ring comprising:
a first annular end arranged on a smaller diameter side;
a second annular end arranged on a larger diameter side;

a conical inner surface arranged between the first and second annular ends and extending at a first conical angle;

a conical outer installation surface arranged between the first and second annular ends, being coaxial with the conical inner surface, and extending at a second conical angle that is different from the first conical angle; and a synchronizer ring comprising:

a first annular end arranged on a smaller diameter side;

a second annular end arranged on larger diameter side;

teeth arranged on a radially projecting flange located at the larger diameter side;

a conical outer surface arranged between the first and second annular ends and extending at a first conical angle;

a conical inner installation surface structured and arranged to, when installed, directly engage with the conical outer installation surface of the friction ring;

said conical inner installation surface being arranged between the first and second annular ends, being coaxial with the conical outer surface, and extending at a second conical angle; and a tab arranged on the second annular end and oriented perpendicular to an axis of the conical inner installation surface, and, when installed, being configured to limit axial movement of the friction ring relative to the synchronizer ring.

7. The synchronizer unit of claim 6, wherein the friction ring further comprises a security against rotation arranged on the first annular end being oriented parallel to said axis and being structured and arranged to, when installed, engage with a first end of the synchronizer ring so as to prevent relative rotation between the friction ring and the synchronizer ring.

8. The synchronizer unit of claim 6, wherein the friction ring further comprises a security against rotation arranged on the conical outer installation surface being oriented perpendicular to said axis and being structured and arranged to, when installed, engage with a cut out of the synchronizer ring arranged on the conical inner installation surface so as to prevent relative rotation between the friction ring and the synchronizer ring.

9. The synchronizer unit of claim 6, wherein the friction ring comprises a slit that allows the friction ring to expand radially.

10. The synchronizer unit of claim 6, further comprising a friction coating arranged on the conical inner surface of the friction ring.

* * * * *